United States Patent [19]
Locher

[11] 3,987,747
[45] Oct. 26, 1976

[54] POWERED AMPHIBIOUS BICYCLE

[76] Inventor: Benjamin Carter Locher, 1611 East E St., P.O. Box 720, La Porte, Tex. 77571

[22] Filed: Nov. 11, 1974

[21] Appl. No.: 522,694

[52] U.S. Cl. .................................. 115/2; 115/27
[51] Int. Cl.² .................................. B60F 3/00
[58] Field of Search ............... 115/27, 1 R, 2, 19, 115/25, 26, 26.3; 280/233, 234; 416/84, 85, 86; 272/71, 73

[56] References Cited
UNITED STATES PATENTS
547,422  10/1895  Dean .................................. 115/27

FOREIGN PATENTS OR APPLICATIONS
27,598  5/1912  United Kingdom .................. 115/27

Primary Examiner—Trygve M. Blix
Assistant Examiner—Barry L. Kelmachter
Attorney, Agent, or Firm—Bernard A. Reiter

[57] ABSTRACT

The conversion assemblage components for imparting to a conventional bicycle an amphibious capability comprising front and rear pontoon assemblies and a power take-off, each of which is readily attached and removable from the conventional bicycle. The pontoon assemblies include front and rear finger which readily adapt such components to detachable connection on the conventional bicycle while the power take-off is detachably connected to the power take-off of the conventional bicycle.

15 Claims, 19 Drawing Figures

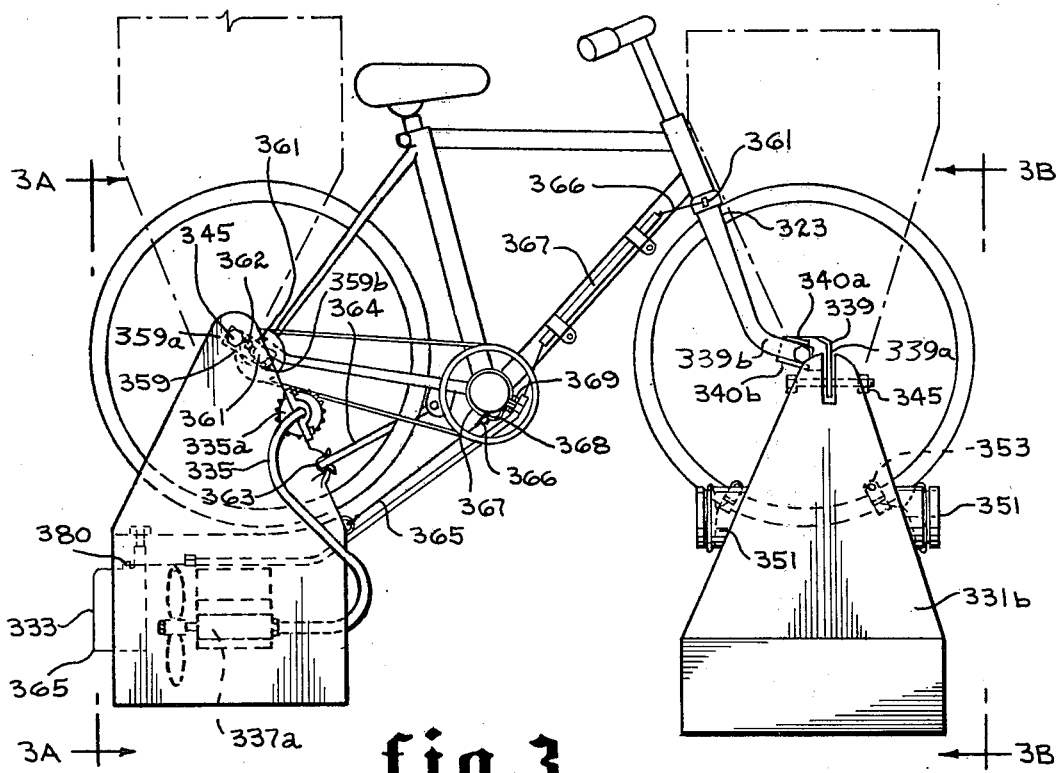
fig.3
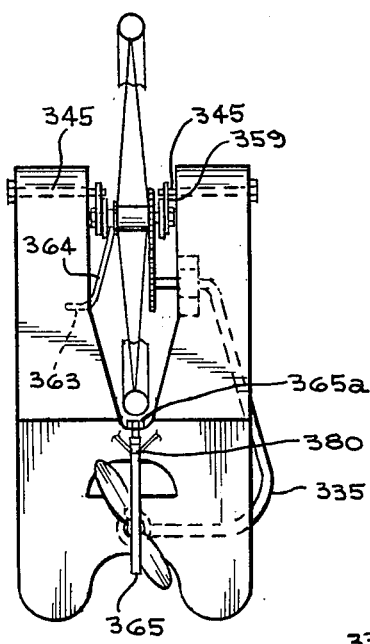
fig.3a
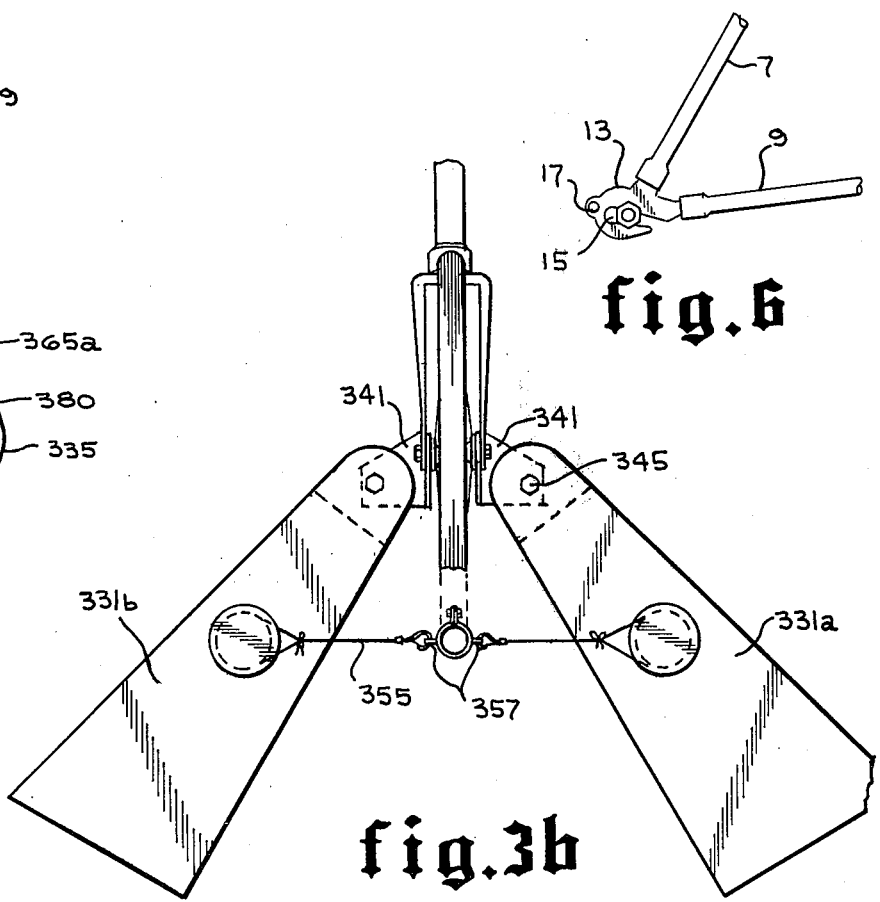
fig.6
fig.3b

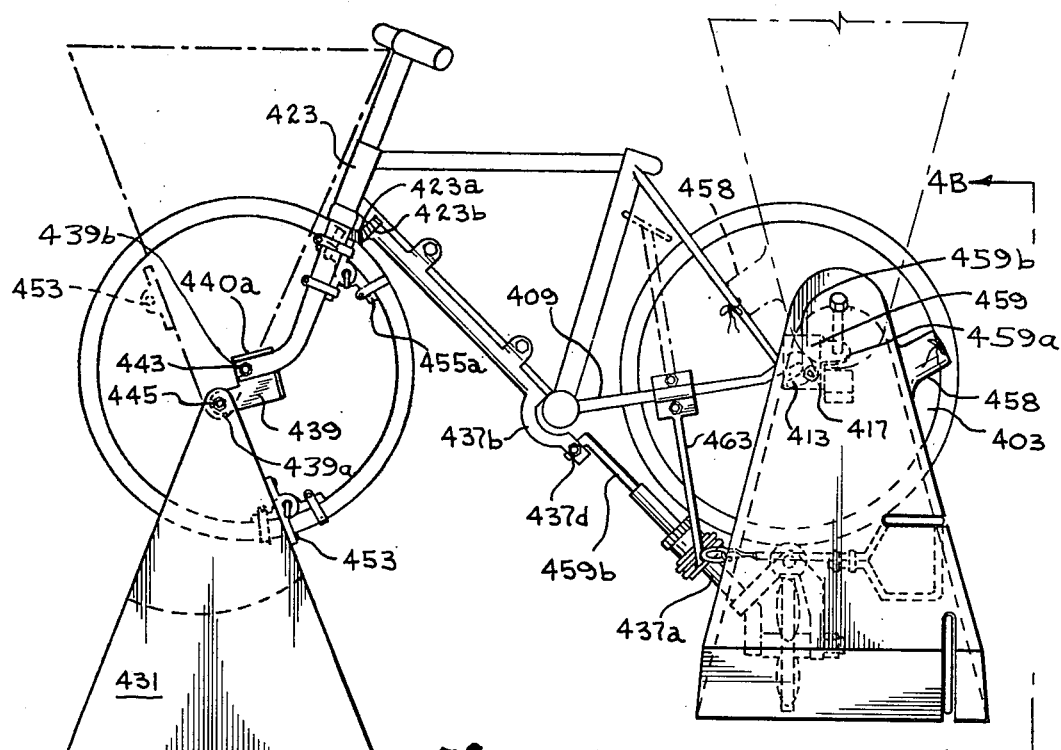

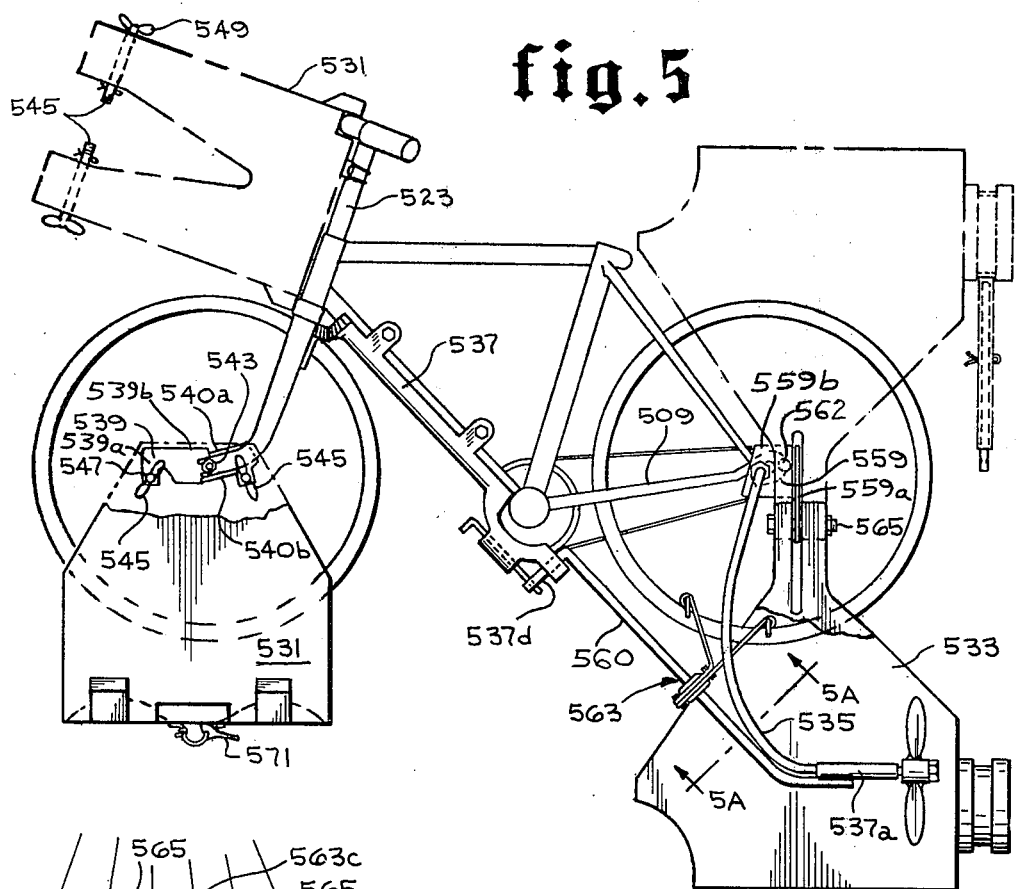
fig.5
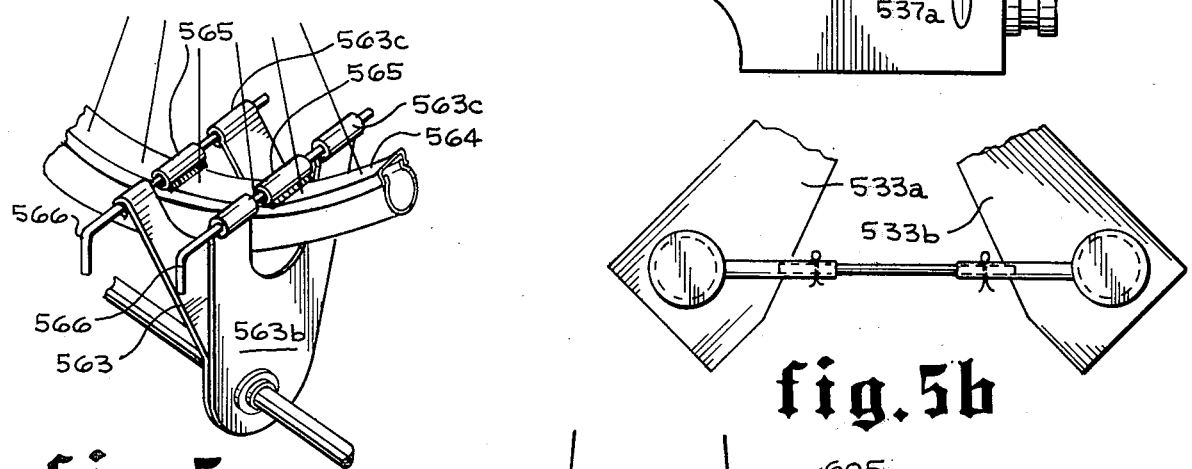
fig.5a
fig.5b
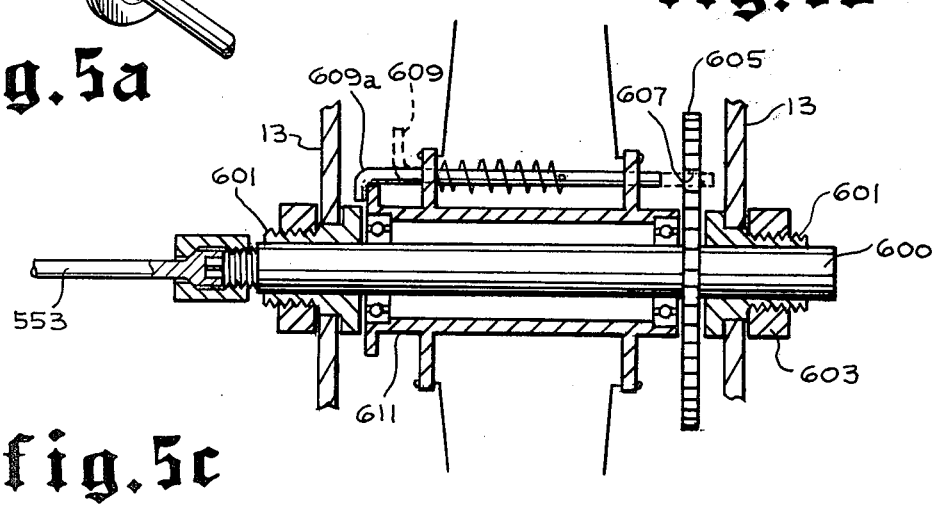
fig.5c

POWERED AMPHIBIOUS BICYCLE

BACKGROUND OF THE INVENTION

This invention relates to water cycles, generally. More particularly, however, it relates to water cycles that are of an amphibious character, that is that which may be operated on land or water.

The present invention directs itself to improvements in the art of amphibious bicycles. The subject of amphibious bicycles has attracted the attention of men practically since the inception of the bicycle itself. Although early patents bear evidence of man's early interest in this subject, it has been only in recent times that commercial interest has manifested itself in this area of research and development. Though the basis for such recent interest may be conjectural, it is suggested that the increased availability of leisure time for the general populace has encouraged industry and commerce to develop products of such a nature. Such products are not only enjoyable but useful in transporting across inland lakes, streams and waterways. A review of all of the devices conceived heretofore for accomplishing amphibious maneuvers will reveal numerous inadequacies which include one or several of the most desirable characteristics, such as aquatic guidance capability, aquatic stability, ease of deployment of pontoons and the retraction thereof upon entry from water to land, and/or a substantial absence of mobility in the water due to crude and inefficient power transmission mechanics. Although this applicant has disclosed and taught an improvement in amphibious bicycles which in large measure obviate numerous of the deficiencies (see prior Pat. application Ser. No. 156,903) a most significant objective remains yet to be accomplished in this field.

All of the bicycles heretofore conceived in the patented art provide for thier amphibious characteristic by means of a plurality of components, generally a pair of pontoons and the like, which constitute an inherent structural feature of the bicycle itself. That is, these components are constructed integrally with the frame superstructure and are generally movable from a retracted position (for use on land) to a deployed position (for use on water). Therefore, the desirability of owning an amphibious bicycle may never be satisfied by a majority of the population since factory-built amphibious cycles are specialty vehicles and are, therefore, relatively expensive and thus difficult to own. There are, however, presently existing great quantities of conventional bicycles owned by the populace and it is readily recognized that the benefits and enjoyment of the amphibious bicycle could be achieved by many if certain principles pertaining to the latter could be incorporated into components that may be attached to these multitudes of conventional bicycles. In order to do so, the principle components to be attached to conventional bicycles must possess the strength and reliability during aquatic operation that a factory-built amphibious bicycle would possess. Of great importance is the fact that the amphibious components be relatively simple and easy to manufacture so that the cost thereof may be but a portion of that which is required to own a factory-built amphibious bicycle.

BRIEF SUMMARY OF THE INVENTION

The present invention constitutes a modification of my earlier filed application, Ser. No. 156,903, filed June 25, 1971, entitled "Amphibious Bicycle", now U.S. Pat. No. 3,844,246. Briefly, the present invention pertains to a plurality of improved component parts in combination with a conventional bicycle and which are readily attached and detached therefrom so as to impart to the bicycle both aquatic and land operability. Unlike conventional prior art amphibious bicycles, the pontoon assemblies are characterized by specifically designed fittings adapted to be attached to the bicycle and to be reliably locked when in deployed position. In addition, there is provided redundant locking means for each of the pontoon assemblies. Furthermore, there is shown a power take-off means that is attached to or removed from the bicycle and reliably and efficiently transmits wheel power to aquatic power with simplicity. These components and the various modifications thereof provide for the relatively simple conversion of a conventional bicycle to one which is capable of amphibious operation. The numerous advantages and features of this invention will become readily apparent upon a reading of the following detailed description, which includes a preferred embodiment and exemplary modifications thereof, and which are shown in the accompanying drawings, wherein like numerals denote like parts in these several views and wherein:

DESCRIPTION OF THE DRAWINGS

FIG. 3 is a side view of a conventional bicycle showing yet another form of attachments which provide to the bicycle an amphibious capability.

FIG. 3(a) is a partial rear view of the bicycle of FIG. 3.

FIG. 3(b) is a partial front view of the bicycle of FIG. 3.

FIG. 4 is a side view of a conventional bicycle showing yet another form of the attachments of the invention which provide to the bicycle an amphibious capability.

FIG. 4(a) is an enlarged isometric of the pillow block structure on the front wheel of the bicycle of FIG. 4.

FIG. 4(b) is a rear view of the bicycle of FIG. 4.

FIG. 4(c) is an isometric view of the aquatic drive assembly of FIG. 4.

FIG. 5 shows a conventional bicycle having still another set of attachments which provide to the bicycle an amphibious capability.

FIG. 5(a) is a left rear view, in isometric, of the hanger assembly of FIG. 5.

FIG. 5(b) is a partial rear view of the bicycle of FIG. 5.

FIG. 5(c) is a cross-sectional view of the rear wheel hub assembly of FIG. 5.

FIG. 6 shows the intersection of the chain stay and wheel stay bars at the rear dropout lug, all as is present on the conventional bicycle.

DETAILED DESCRIPTION OF THE INVENTION

Figure 1:
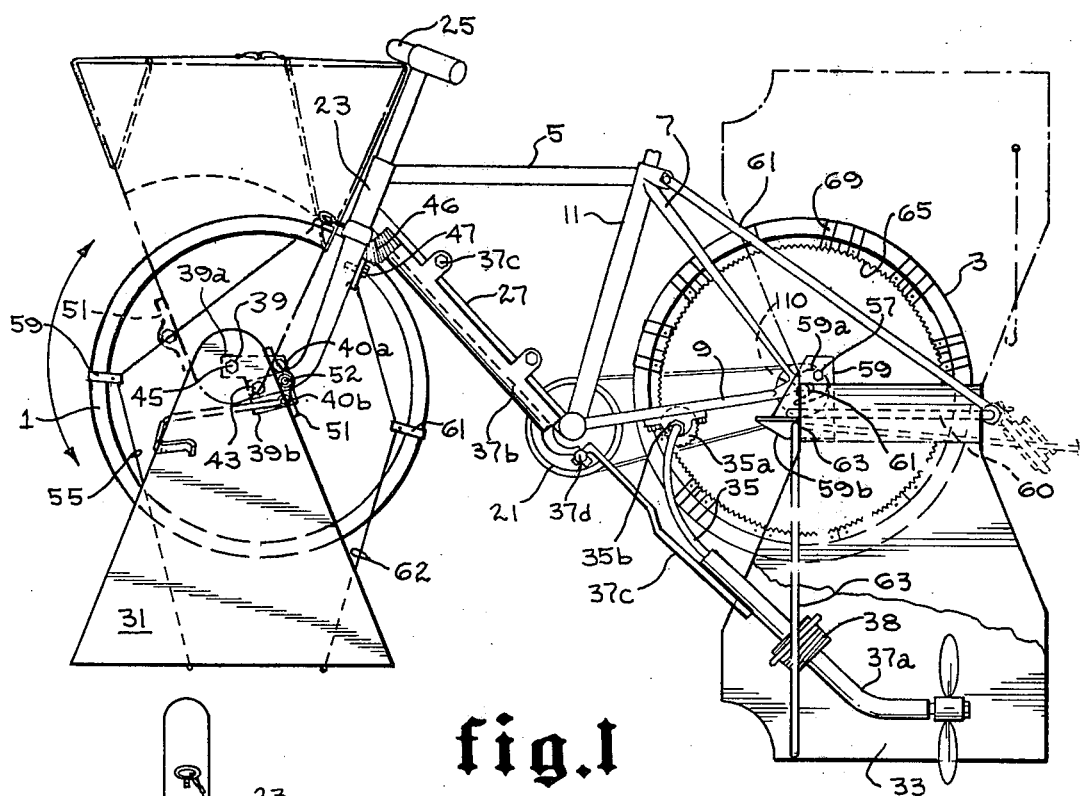
FIG. 1 is the side view of a conventional bicycle showing a preferred embodiment of the attachments which, in accordance with the invention, provide for an amphibious capability.

With reference now to FIG. 1 there is shown a conventional bicycle consisting of the front wheel assembly 1, rear wheel assembly 3 and the frame 5. The frame 5 is characterized by a plurality of inter-connected bars which includes the wheel stay 7, chain stay 9 and seat bar 11, all arranged in conventional manner. The wheel stay 7 and chain stay 9 conventionally intersect at the rear dropout lug 13, see FIG. 6. The rear dropout lug may either be integral with or separately affixed to the stays 7 and 9. The lug 13 is characterized by a shoulder 15 which is adapted to receive the axle of the rear wheel assembly 3. The lug 13 is further characterized by a fender hole 17, the function of which in connection with the invention will be described hereafter.

The conventional bicycle is further characterized by the well known sprocket assembly 21, the fork assembly 23, handle bars 25 and connecting bar 27. All of these parts are of conventional design.

Conversion of the conventional bicycle into one of amphibious capability requires the utilization and attachment of a front pontoon assembly 31, a rear pontoon assembly 33 and a power take-off means, generally indicated at 35. The aquatic drive and navigation means 37 is the subject of my earlier filed aforementioned application Ser. No. 156,903. Each of these three principle components, that is, the front pontoon assembly, the rear pontoon assembly and the power take-off means from the rear wheel, provide for the most efficient conversion, and reconversion of the conventional bicycle to an aquatic cycling device, and back to a conventional land cycle. The relative ease of attachment and removal of these components follows hereafter.

Figure 1A:
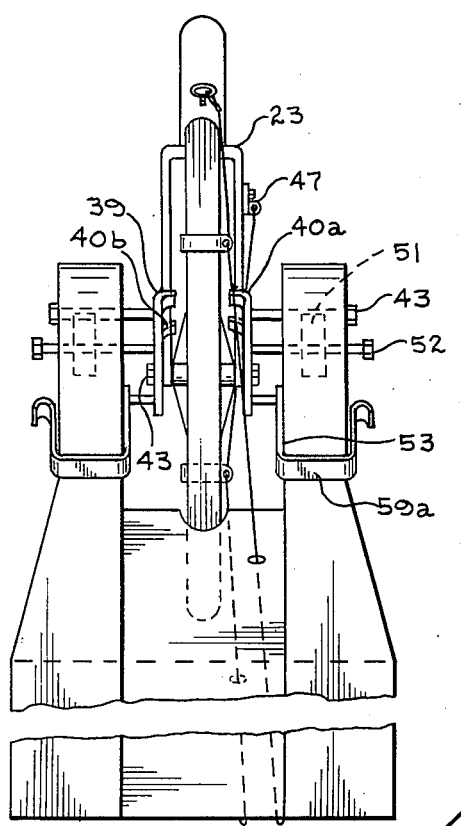
FIG. 1(a) is a partial front view of the bicycle of FIG. 1.

The front pontoon assembly of FIG. 1 is normally carried on the bicycle in its upper or retracted position when the bicycle is being used on land. This position is shown in ghost form. The front pontoon assembly 31 is rotatably supported on the bicycle at the lower terminal end of the fork assembly 23. Here, there is provided a specially designed fitting 39 which is adapted to be attached to each leg of the fork assembly 23, See FIG. 1(a). The fitting 39 comprises an upper leg 39a and a lower leg 39b. The lower leg 39b includes a front and rear finger 40a, 40b. Each of the front and rear fingers on each of the fittings 39 are adapted to fittingly engage one of the prongs of the fork assembly 23 so as to preclude rotational movement of the fitting 39 about its point of connection. The point of connection of the fittings 39 occurs through a first coupling means or axle nut 43, see FIG. 1(a). It will thus be recognized that the fitting 39 is thus connected to the fork at the aforementioned axle nut 43 and restrained against movement by engagement of the fingers 40a, 40b with each respective prong of fork assembly 23. Attachment of the fitting to the bicycle fork is most expeditious because of the utilization of the single nut, such nut 43 existing as an integral part of the conventional bicycle.

The fittings 39 are each characterized by a pontoon mounting bolt 45 which extends through the fittings proximate the outer end of upper leg 39a. The pontoon bolt extends entirely through each of the fittings 39 and through the pontoon assembly 31 so as to provide to the pontoon a rotational capability around the bolt. As will be visualized by examination of FIG. 1, the pontoon assembly 31 is adapted to rotate therefore freely around the pontoon bolt 45 into its deployed position. The pontoon assembly is fixed in the deployed position by a plurality of locking mechanisms which assure confident and reliable retention of the pontoon assembly below the bicycle frame, thus maintaining the frame substantially above the level of the water.

The front pontoon assembly 31 is maintained in position by a pillow block 51 which is fixedly connected to the pontoon surface (see ghost of pontoon in FIG. 1). A pillow block bolt 52 is adapted to be received in a bore of the pillow block, which bore is aligned with a cooperating bore in each respective fitting 39 so that when the pontoon assembly is deployed to the aquatic position, the pillow block bolt 52 is inserted through the cooperating bores of the pillow block and fork to thereby lock the pontoon against rotational movement in either direction.

A second or redundant locking mechanism is provided for the front pontoon assembly. This redundant locking mechanism takes the form of a pair of restraining flange means 53 which is rotatably connected to the lower leg 39b of fitting 39 and is characterized by a pontoon edge engaging leg 53a. The flange means 53 need only be rotated upwardly in order to release the pontoon for clockwise movement into its stowed position.

A still further redundant locking apparatus for the front pontoon assembly 31 takes the form of a pair of guy wire means consisting of a front wire 55 and a rear wire 57, both of which are tied to respective front and rear bottom portions of the pontoon assembly, see FIG. 1. Front wire 55 is threaded forwardly through a clamp means 59 affixed to the front of the front wheel assembly, and thereafter tied to an eye bolt adjacent fork assembly 23 to thereby restrain further the counter-clockwise movement tendency of front pontoon assembly 31. Rear wire 57 extends upwardly and rearwardly to a similar clamp means 61 affixed to the rear of front wheel assembly and forwardly to eye 63, fastened to fork 23 by means of screw 47, (see FIG. 1). Rear wire 57 thereby restricts the tendency of clockwise movement of pontoon assembly 31.

The front pontoon assembly in FIGS. 2 through 5, and the respective apparatus of attachments for such pontoons are analogous to that described with respect to FIG. 1. For example, in FIG. 2 the fitting 139 consists of an upper leg 139a and a lower leg 139b. Characterizing the upper leg is a front finger 140a, while characterizing the lower leg 139b is a rear finger 140b. The fingers, 140a and 140b, are adapted to bear against, respectively, the upper and lower surfaces of the terminal ends of the fork assembly 123. These fittings (139) are similarly characterized by an upper bore in which the pontoon bolt 145 is inserted for rotational support of pontoon assembly 131. The pontoon assembly is characterized by integrally attached pillow blocks 153 having a central bore 151, see FIG. 2(a). Extending from the pillow block and pivotly supported thereon is a pillow block connecting rod 155 which is adapted for attachment by a nut onto the threaded end of the extension rod 157. It will be recognized that the fixed length of the pillow block connecting rod 155 automatically positions the pontoon assembly 131 when it is in the deployed position and that it reliably restrains the pontoon assembly from movement in either direction. A redundant locking mechanism is provided by a wing bolt 161 which, when the pontoon assembly is deployed, is adapted to be screwed into the pontoon so as to lock the latter into fixed position, see FIG. 2(a). It will thus be seen that the wing bolts 161 preclude clockwise rotation of the pontoon while the pillow block and its associated bolt 153 preclude counter clockwise rotation and clockwise rotation of the assembly.

Figure 2:
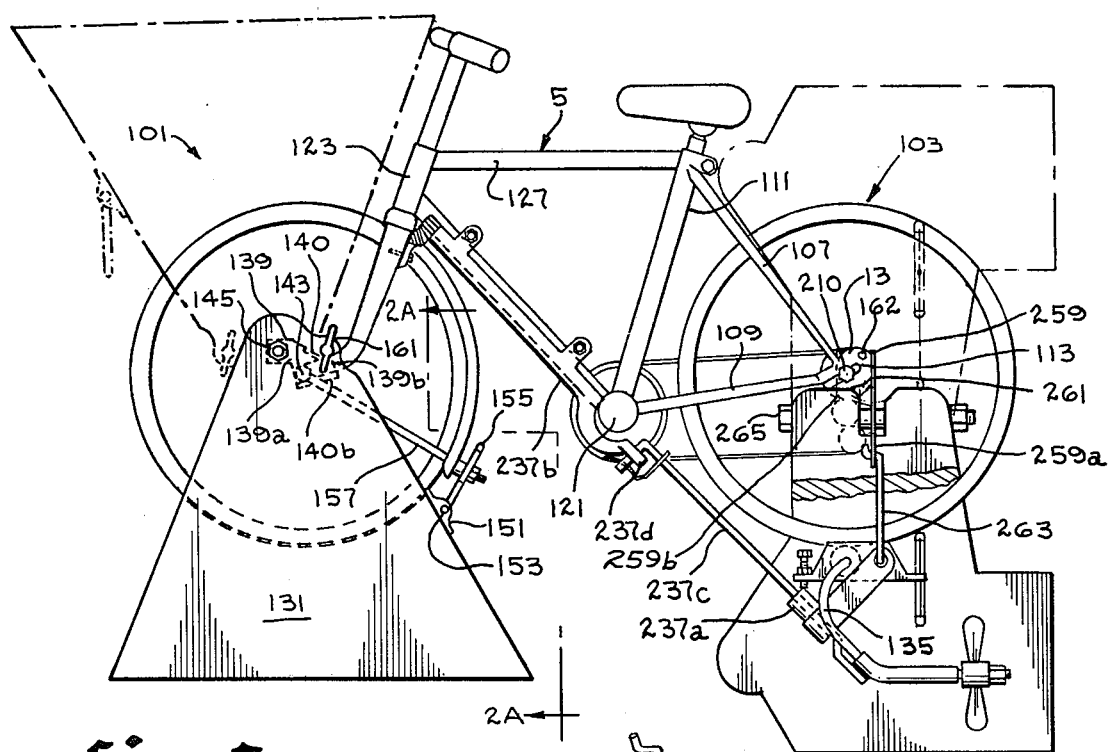
FIG. 2 is a side view of a conventional bicycle showing another form of the attachments which provide to the bicycle an amphibious capability.

By way of analogous structure, with respect to FIG. 3, the fitting 339 comprises a front finger 340a and a rear finger 340b. The front and rear fingers are adapted to engage the terminal ends of the fork so as to thus restrict movement of the fitting 339. The fitting 339 is further characterized by a lateral leg 339(a) and a longitudinal leg 339(b), each of which receives a pontoon bolt 345. The pontoon bolt 345 provides for pivotal movement of each pontoon 331a and 331b from the lower, deployed position to the upper or stowed position. Here it is noticed, of course, that the front pontoons pivot laterally to the side rather than longitudinally as is shown in FIGS. 1 and 2. Each of the pontoons 331a and 331b are locked in their respective deployed positions by a pair of grooved studs 351, guy wires 355, and flanged clamps 353, (see FIGS. 3 and 3b). Redundancy locking of the pontoons is achieved through the use of two snap-on guy wire means removably attached to hook rings 357 that are integral with the flanged clamp 353.

Another embodiment of the front wheel detachable pontoon assembly is shown in FIG. 4 where, for example, the fitting 439 having leg means 439(a) and 439(b) is again attached through use of the axle nut 443. A front finger 440a and a rear finger 440b are arranged in perpindicular relation to one another on the fitting so as to engage the terminal edges of the fork assembly 423. The locking arrangement for the pivotal pontoon assembly 431 constitutes the pontoon mounted pillow blocks 453 (also see FIG. 4(a)) which are adapted to engage a cooperating locking mount 455 which is attached to the tire and rim. When the pontoon is deployed to its aquatic position, a locking pin 457 is inserted through the pillow blocks and locking mount so as to thereby obstruct movement of the pontoon. A redundant locking means is provided through use of two pillow blocks, 453, on the fork assembly 423, and two pillow blocks 453 on the pontoon assembly 431.

FIG. 5 discloses yet another alternative embodiment in which the front pontoon assembly 531 is not adapted to pivot at all on the front wheel, but is instead adapted to be either portably carried by the bicycle or stowed until ready for use. When stowed in such other place, the pontoon is simply carried to the cycle and positioned adjacent the front fork.

The front pontoon assembly 531 consists of a unitary pontoon which is adapted to be removed from its carried position adjacent the fork assembly 523 and rotated into position for attachment to the fitting 539 described hereafter.

The fitting 539, having first and second leg means 539(a) and 539(b) is adapted to be attached to the terminal ends of the fork 523 by means of axle nut 542. The fitting is further characterized by the forward 540a and the rearward 540b fingers which are disposed in substantially parallel fashion so as to engage the respective upper and lower surfaces of the terminal ends of the fork 523. This locks the fitting into fixed position relative to the fork 523.

Fitting 539 contains threaded bore 547 and 563 which will accept pontoon bolts 545. Pontoon assembly 531 is attached to fitting 539 by inserting pontoon bolts 545 into bore 547 and 563 and twisting thumb wings 549 until bolts 545 are tightened down upon the fitting 539. Thus it will be seen that pontoon bolts 545 cooperate with one another and with fingers 540a and 540b to reliably lock the pontoon assembly 531 in its deployed position.

Upon conversion of the aquatic bicycle to a land cycle the pontoon bolts 545 with thumb wings 549 are simply loosened so as to disengage the pontoon assembly from the fork. The pontoon assembly may then be lifted into its stowable position adjacent the handlebars. Here, an over-center latch 571 is adapted to engage the handlebar post in order to lock the pontoon assembly in fixed relation.

The rear pontoon assemblies disclosed in the drawings are, like the front pontoon assembly, characterized by a fitting or bracket means which is capable of a variety of objectives. These include a reliable means for supporting the pontoon assembly whether it be in its retracted or deployed position. Also the bracket means is capable of supporting the pontoon assembly as it is deployed from one position to the other. The bracket assembly also is adapted to support the drop hanger which supports the aquatic drive and navigation means.

Figure 1B:
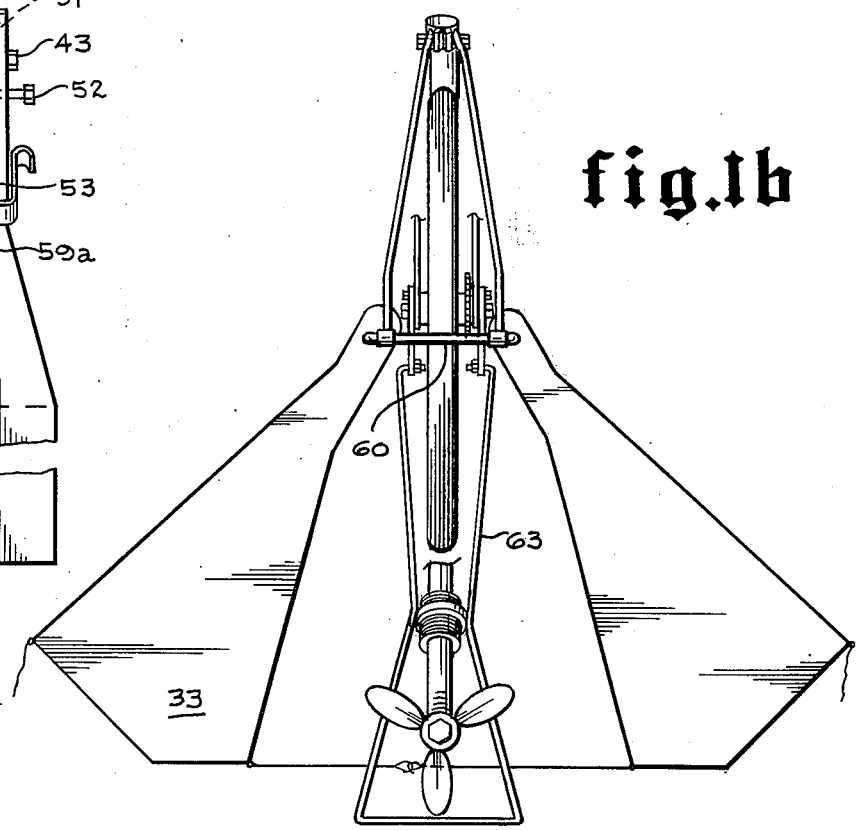
FIG. 1(b) is a partial rear view of the bicycle of FIG. 1.

The rear pontoon assembly is best shown in its deployed position in FIG. 1(b). The pontoon assembly is adapted to be rotatably deployed around axle bolt 60 (see FIG. 1(c) and is "U" shaped. It supports both pontoons 33.

The rear bracket itself comprises an upper leg 59a and a lower leg 59b. Lower leg 59(b) is offset outwardly with respect to upper leg 59(a), (see FIG. 1c). Lower leg 59b contains a bore 65 in which axle bolt 60 is fastened with cotter pin 68. Drop hanger 63 attaches to lower leg 59(b) through bore 66, with nut 67.

Figure 1C:
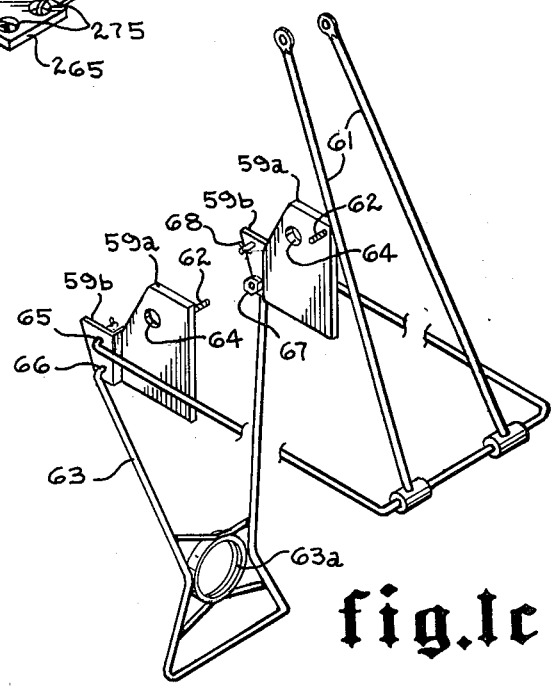
FIG. 1(c) is an isometric view of the hanger assembly of FIG. 1.

Fitting 59 is attached to the bicycle itself by inserting bicycle axle 110 through bore 64 and using nut 261 (FIGS. 1 and 1(c). Fitting 59 is positioned so that stud 62 passes thru fender hole 17, (FIG. 6), in the rear dropout lug 13. It will be seen that the engagement of stud 62 with lug 13 thru hole 17 will prevent rotational movement of fitting 59 about axle 110, thus enabling a rigid structural mount of fitting 59 to the bicycle.

The drop hanger is a unitary substantially U shaped rod that pivotally extends from the lower leg on one bracket to the lower leg on the other and is adapted to supportingly engage the aquatic drive and navigation assembly 37 at the lower end thereof. The aquatic drive assembly portion 37a is detachably connected to the upper portion 37b as at 37d. The upper navigation assembly 37b may remain fixed on the bicycle at all times once it is easily installed by connection to the bicycle structure through use of simple nuts and bolts 37c. The drop hanger 63 contains internally threaded ring 63a, (see FIG. 1c). The lower drive and navigation means 37a carries a threaded shoulder 38, (see FIG. 1). Several clockwise rotations of shoulder 38, during set up for aquatic use, engage the threads of ring 63a, and thereby prevents lateral or longitudinal movement of drive means 37a during aquatic use of the cycle.

The drop hanger 63, in conjunction with the chain stay 9 and drive assembly 37a form a structural triangle which is not only collapsable and removable in order to convert the bicycle to land use, but which, while in its aquatic mode, forms a rigid and reliable platform for the power take-off means 35. The power take-off means 35 consists of a flexible power take-off cable which communicates with rotating drive gears 35a. The drive gear 35a is adapted to engage a plurality of cooperating gear segments 65 which may be installed in quarter sections on the interior of the wheel. The gear segments 65 are attached to the rear wheel by a strap or other appropriate means 69 which circumferentially engages the tire or otherwise locks the gear segments 65 in position. Rotational movements of the pedals by the bicycle operator simply rotates the sprockets and chain (not numbered) so as to turn the rear wheel and concomitantly cause rotation of the drive gear 35a. Such drive gear movement is important to the power take-off means 35 to cause rotation of the propeller at the stern of the bicycle. When it is desired to convert the bicycle to land mode, the drive assembly 37a is disengaged from the gear segments 65 by removing nut 35b, thus producing separation from the navigation means at attachment point 37d. The unitary piece, referred to as the drive assembly 37a is thus removed, this including the power take-off means 35 and the navigation bar which connects at attachment point 21a. The hanger 63 is then pivoted upwardly to the stern section of the cycle where it is latched into position, as shown in ghost in FIG. 1.

With reference now to FIG. 2, a similar rear bracket means 259 is connected to the rear drop-out lug 13 (see FIG. 6) by means of axle nut 261 that fastens axle 210 through an aperture in the bracket. Stud 162 on bracket 259 passes through a bore or fender hole 17 in the rear part of the drop-out lug 13 (see FIG. 6). The fender hole 17 in the rear of the drop-out lug is a hole that is conventionally present in bicycle lugs.

Figure 2B:
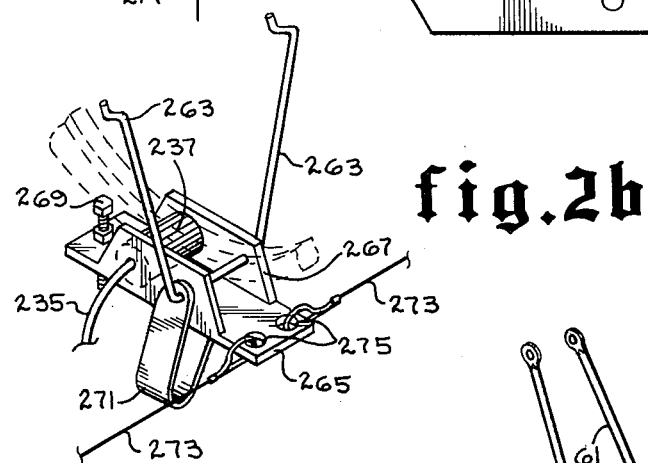
FIG. 2(b) is an isometric view of the hanger assembly of FIG. 2.
Figure 2A:
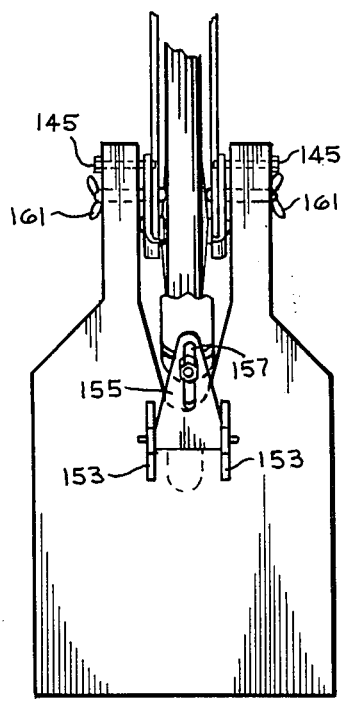
FIG. 2(a) is a rear view of the front pontoon assembly of FIG. 2.

The rear bracket means 259 further includes a laterally directed, downwardly extending leg means or flange 259(a) which is adapted to receive the elongate pontoon bolt 265. The pontoons are of separate construction so that each is adapted to rotate about its respective bolt 265 in a direction perpendicular to the wheel axle. The lower end of flange 259(a) is characterized by an aperature which receives the upper hooked end of drop hanger 263, (see FIG. 2(b). The drop hanger 263 is connected, at its lower end to a housing means 265 in the form of a channel, for example. The channel shaped housing means comprises a pair of legs 267 for both receiving the drop hanger 263 and for supporting the power take-off mechanism 235.

The power take-off mechanism 235 consists of a friction wheel means 237 which is adapted to engage the rotating tire on the rear wheel assembly 103. Rotation of the friction wheel 237 transmits a rotative force through the take-off means to the propeller (generally shown in FIG. 2). The housing means 265 is further characterized by an adjusting bolt means 269 that is adapted to engage the rear drive assembly 237a in order to keep the former in rigid structural relation so as to produce a firm engagement in between the friction wheel 237 and the tire. Supported from the drop hanger 263 is a U shaped strap means 271 which cradles the drive assembly when the adjusting bolt means 269 exerts a downward force on the assembly 237a. Lateral stability ropes 273 are tied into holes 275 in the housing means 265 in order to maintain the pontoons in fixed relation to the cycle when the pontoons are deployed. It will thus be recognized that the same advantageous structural triangle is produced as in FIG. 1. Here the structural triangle comprises the chain stay 109, the drop hanger 263 and the lower leg 237(a) of the navigation means. This component triangle assures fixed and reliable engagement of the power take-off means 135 with respect to the back wheel and yet permits expeditious and easy removal of the entire aquatic mechanism, including pontoons for purposes of land use.

In FIG. 3 is shown another form of attachment for the rear pontoon and related assemblies. Here the rear bracket means comprises a plate 359. The bracket is affixed to the cycle by axle nut 361 and stud 362 which extends through the fender hole 17 (FIG. 6). The pontoon bolt 345 extends through an aperture in the upper end of the bracket 359 and is adapted to support each side of the pontoon thereon, see FIG. 3(a). The pontoon assembly 333 is of integral construction and is adapted to swing rearwardly of the bicycle up and over the rear tire and into its stowed position adjacent the seat. Integrally disposed within the flotation material of the pontoon is the drive assembly 337a. The pontoon is so shaped as to permit exposure of the propeller in the manner shown in FIGS. 3 and 3(a). Rudder vane 365 is attached to pontoon 333 by nut 365(a). Actuation of the handlebars causes terminal 361 on upper end of flex cable 366 to pull or push cable out of or into cable housing 367. This movement is translated to rudder vane 365 by simultaneous movement of terminal end 380 attached to rudder vane, thereby causing navigation to be imparted to the cycle when in aquatic use. During land use the flexible cable is removed. A drop hanger 363 is attached rigidly to pontoon 333 which has right and left sides 333(a) and 333(b) and supports drive assembly 335. The conventional kickstand of the bicycle is adapted for ready insertion into an aperture in the bottom end of drop hanger 363. Kickstand 364 serves to produce the removable structural triangle which is necessary for reliable engagement and operation of the power take-off means 335. Here the power take-off means 335 is adapted to firmly engage the sprocket chain of the cycle so that rotation of the sprocket through the application of pressure to the pedals produces a correlative rotation in the drive gear 335a. The rotational force of the gear is, of course, transmitted via the power take-off into the drive assembly and hence to the propeller to thereby impart an aquatic ability to the cycle. It will be readily recognized that removal of the aquatic ability is efficaciously accomplished by disengagement of the snap hook 366 with loop 368 of clamp 367, thus allowing rotational movement of the entire rear pontoon assembly 333 and the drive assembly 337a contained therein along with the power take-off and accompanying gear means which are mounted on the hanger 363.

With regard to FIG. 4, there is shown a rear wheel assembly 403 which is supported on a conventional drop-out lug 413 (see FIG. 6). The drop-out lug is characterized by the rear fender hole 417 through which is inserted a bolt 462 for affixing the rear bracket 459, having first and second leg means 459(a) and 459(b) see FIG. 4(b). Axle nut 461 further fastens bracket 459 to bicycle. The bracket 459 is characterized by a bore through which the pontoon bolt fits, and clamps the pontoon in position. The pontoon is adapted to rotate about the pontoon bolts, from the deployed position into its retracted position in which the pontoons are vertically upstanding (see FIG. 4(b).

A bumper means 458 maintains the retracted pontoon in spaced relation to the bicycle seat, (FIG. 4).

The aquatic drive and navigation assembly 437 is affixed to the cycle in the same manner as explained with regard to FIG. 1. That is, the rear drive assembly 437a is coupled to the upper navigation assembly 437(b) at attachment point 437(d) so as to impart to the drive assembly a navigation capability that is actuated by the handlebars and transmitted through the cooperating gear segments 423a and 423b. The rear drive assembly is supported by the aforementioned structural triangle which consists of chain stay 409, pivoted drop hanger 463 which clampingly engages the chain stay, and, of course, the leg bar 459b which connects the rear drive assembly to the point 437(d).

The power take-off means 435 consists of a housing means 465 which supports, in rotatable manner, the worm gear roller 437. The roller teeth are adapted to engage the cooperating ring gear 438 which houses the propeller in fixed relation thereto. The ring gear 438 and the interiorly mounted propeller are adapted to rotate about the rear drive shaft 437a, see FIGS. 4 and 4(c). When the pontoon assembly is in its deployed position, the worm gear roller 437 is in pressure engaged position by reason of tension in drop hanger 463, and pedaling of the bicycle thereafter produces a rotation of the rear wheel that drives the propeller in accordance with the structure illustrated in FIG. 4(c). Locking of the pontoons in the deployed position is accomplished through the guy cable 468 which is attached in the manner shown in FIGS. 4 and 4(b).

In regard to FIG. 5, there is shown still another form of the rear wheel fitting 559 and which comprises a lateral downwardly extending first leg means 559a through which extends a pontoon bolt 565 for mounting the rear pontoon assembly 533 and a second leg means 559(b) for affixing the fitting with a bolt 562 to the frame. The pontoon assembly is, as shown in FIG. 5(b) composed of separately mounted pontoon sections 533a and 533b which are adapted to pivot upwardly into their retracted position as shown in FIG. 5. The power take-off means 535 extends directly from the propeller mechanism, constituting a part of the drive assembly 537a. The navigation shaft or leg 560 is integrally connected to the drive assembly at coupling point 537d. The structural triangle in this design comprises navigation shaft or leg 560, chain stay 509 and the drop hanger means 563, see FIG. 5(a). The hanger means 563 includes angularly related legs 563a and 563b, both of which are characterized by circular flanged ends 563c. Integrally attached to rear wheel rim 564 of the bicycle, such as by welding, is a cooperating circular bushing 565 for each of the circular flanges 563c. A locking rod 566 is provided for each of the cooperating sets of circular flanges so as to thereby fixedly position not only the rear wheel but also the supported drive assembly. The hanger means 563 coacts with the rigid structure of the sheel itself to thus provide the desired structural triangle referred to herein above.

Since the wheel of the cycle of FIG. 5 is fixed in position by locking rods 566, the transmission of power from the pedals is accomplished directly from the axle of the rear wheel rather than the surface of the rear wheel or tire as has been the case hereinbefore. For this purpose, there is provided a specially designed rear axle assembly for transmitting the power directly therefrom to the propeller; refer to FIG. 5(c). Here, the axle 600 is characterized by a pair of threaded bushings 601 on each end thereof. The rear drop-out lug 13 is disposed over the circumferential recessed surface of the bushing and locked thereon by the nut 603. The rear sprocket 605 is affixed on the axle and is characterized by a sprocket hole 607 which is adapted to receive a withdrawable pin 609 that is mounted on axle hub 611. The pin is spring loaded in its normally inserted position. The hooked end 609a is adapted to be engaged over the edge flange of axle hub 611, for the aquatic drive position. When the pin 609 is fixed in its withdrawn position (solid lines FIG. 5(c), the sprocket 605 causes rotation of the axle 600. This rotational movement of the axle is transmitted through a coupling to the power take-off 553, see FIG. 5 and 5(c). When the pin, on the other hand, is disposed in the sprocket hole 607, the rotation of the sprocket causes correlative rotation of axle hub 611. This, of course, produces rotation of the rear wheel assembly, thus causing mobility on land.

With due regard to the numerous examples and embodiments set forth hereinabove, it should be noted that numerous other embodiments of the invention are conceivable. In view of this, it is urged that the following claims be interpreted to encompass the various modifications set forth herein but that such interpretation be not limited to the exemplary design shown herein since the spirit and scope of this invention is to, in fact, be defined by the claims rather than the explicit examples illustrated.

Therefore, that which is claimed and desired to be secured by United States Letters Patent is:

1. In combination with a bicycle having front and rear wheel assemblies respectively supported from front fork means and rear lug means, and a sprocket type chain drive operatively connected to the rear wheel assembly for driving the bicycle on land, the improvement comprising aquatic support means removeably attached to the bicycle for imparting thereto a mode of operation on a body of water, said aquatic support means including:
   front and rear pontoon assemblies each of which includes a fitting, each of said fittings being characterized by first and second leg means.
   a first coupling means removeably affixing the front fitting to the fork means,
   a second coupling means removeably affixing the rear fitting to the lug means,
   a drop hanger means supported from the lug means for carrying an aquatic drive mechanism,
   an aquatic drive and navigation assembly and,
   a power take-off means operatively associated with the rear assembly for transmitting the rotative forces to the aquatic drive mechanism,
   said drop hanger means fixing the stability of said power take-off means while simultaneously supporting the aquatic drive means.

2. The combination of claim 1 wherein said power take-off means includes a gear means in operative engaging relation with a sprocket chain.

3. In a conventional bicycle having a frame includng a fork supporting a front wheel assembly, and further having chain stay and wheel stay means intersecting at a lug means to support a rear wheel assembly, the rear wheel assembly further including a sprocket driven chain operatively connected to said rear wheel assembly for producing rotation thereof, the improvement comprising:

a rear fitting means removeably affixed to said lug means for supporting a drop hanger means and a rear pontoon assembly;

said drop hanger means being pivotly mounted and downwardly supported from said rear fitting means, and a power take-off means supported from said drop hanger means and adapted to engage said rear wheel assembly for converting rotational movement of said rear wheel assembly into aquatic propulsion, and an aquatic drive assembly also supported from said drop hanger means for aquatically propelling the bicycle when in the water upon deployment of the drop hanger downwardly, a front fitting means removeably affixed to the fork, said fitting means affixed to the fork being configured to engage the fork so as to preclude rotational movement of the fitting means, a front pontoon assembly rotatably mounted on the front fitting means, said rear pontoon assembly mounted on the rear fitting means so as to enable aquatic operation of the bicycle upon deployment of the aforesaid front and rear pontoon assemblies.

4. The combination of claim 3 wherein said power take-off means includes a housing means supported from said drop hanger means, and:

a friction wheel affixed to said housing means and engaging the bicycle rear wheel assembly, a transmission means operatively connected to the friction wheel at one end and to the aquatic drive assembly at the other for converting rotation of the rear wheel into aquatic propulsive power, adjustment means for varying the pressure of the friction wheel against the rear wheel assembly, said adjustment means being operatively supported on said housing means.

5. The combination of claim 3 wherein said drop hanger means is connected to said rear fitting means by a hook in the upper end of the drop hanger means, which hook is inserted into a bore in said rear fitting means.

6. The combination of claim 5 wherein fork fitting means includes first and second finger means, each said finger means apposingly engaging the sides of said fork, redundant locking means connecting the front pontoon assembly to the bicycle so as to restrict movement of the front pontoon assembly when in the aquatic position, said redundant locking means including a pillow block means affixed to said fitting means and engaging the pontoon means when in the deployed position to thereby preclude rotational movement of the pontoon means in one direction, and restraining flange means also supported from said fitting means and engaging the pontoon means to thereby preclude rotational movement of the pontoon means in the other direction, said locking means being separately actuated and engaged to different and distinct surfaces of the pontoon means.

7. The combination of claim 6 wherein said drop hanger means structurally co-operates with the chain stay and with the aquatic drive assembly to form a structural triangle insuring stability and reliability during aquatic operation.

8. The combination of claim 7 wherein said power take-off means includes a friction gear in contact with the tire of said rear wheel assembly.

9. The combination of claim 7 wherein said power take-off means is operatively engaged with the axle of the rear wheel assembly.

10. In a conventional bicycle, having a fork supporting a front wheel assembly, and further having chain-stay and wheel-stay means, a lug means connecting said chain-stay and wheel-stay means and supporting a rear wheel assembly, the bicycle still further including a sprocket drive chain operatively connected to said rear wheel assembly for producing rotation thereof, the improvement comprising:

a rear fitting means removably affixed to said lug means supporting a drop hanger means, said drop hanger means being pivotly mounted to and downwardly supported from said fitting means for supportively carrying a power take-off means, said power take-off means adapted to engage said rear wheel assembly for transmitting rotational movement of the rear wheel assembly to an aquatic drive assembly, and the aquatic drive assembly operatively associated with said power take-off means and supported from said drop hanger means for aquatically propelling the bicycle when in the water a front fitting means removably affixed to the fork flotation means rotatably supported both from said front and rear fitting means, and redundant locking means fixing the position of each said flotation means when in their deployed position, one of the locking means on the front flotation means including a pair of leg mean extending from the front fitting and engaging the fork when deployed.

11. In a conventional bicycle having a fork supporting a front wheel assembly, and further having a chain-stay and wheel-stay means, a lug means connecting said chain-stay and wheel-stay means and supporting a rear wheel assembly, the bicycle still further including a sprocket drive chain operatively connected to said rear wheel assembly for producing rotation thereof, the improvement comprising:

a rear fitting means removably affixed to said lug means for supporting a drop hanger means and a rear pontoon, a front fitting means removeably affixed to the fork for supporting a front pontoon, said drop hanger means being pivotly mounted and downwardly supported from said rear fitting means for carrying a power take-off means, and said power take-off means engaging for converting rotational movement of said rear wheel assembly into aquatic propulsion, and an aquatic drive assembly supported from said drop hanger means for aquatically propelling the bicycle when in the water, said front fitting means including first and second finger means, each said finger means opposingly engaging the sides of said fork when the front fitting means is pivoted into a deployed position, Redundant locking means including a pillow block means affixed to said front fitting means and engaging the front pontoon means when in the deployed position to thereby preclude rotational movement of the front pontoon means in one direction, the front and rear pontoons pivotly supported respectively from each said fitting means so that each may be moved from a stowed to a deployed position.

12. The combination of claim 11 wherein said power take-off means includes a friction gear in contact with the tire of said rear wheel assembly.

13. The combination of claim 11 wherein said power take-off means is operatively engaged with the axle of the rear wheel assembly.

14. The combination of claim 11 wherein said drop hanger means is disposed to structurally cooperate with the chain-stay and with the aquatic drive assembly to form a structural triangle insuring stability and reliability during acquatic operation.

15. The combination of claim 13 wherein said power take-off means includes a gear means in operative engaging relation with the sprocket chain.

* * * * *